June 16, 1925.

H. S. DICKINSON

POWER SHIFT FOR CULTIVATORS

Filed April 14, 1921

Harry S. Dickinson
INVENTOR

L.C. Shontz
ATTORNEY

Patented June 16, 1925.

1,542,376

UNITED STATES PATENT OFFICE.

HARRY S. DICKINSON, OF MOLINE, ILLINOIS, ASSIGNOR, BY MESNE ASSIGNMENTS, TO MOLINE IMPLEMENT COMPANY, A CORPORATION OF ILLINOIS.

POWER SHIFT FOR CULTIVATORS.

Application filed April 14, 1921. Serial No. 461,336.

*To all whom it may concern:*

Be it known that I, HARRY S. DICKINSON, a citizen of the United States of America, residing at Moline, county of Rock Island, State of Illinois, have invented certain new and useful Improvements in Power Shifts for Cultivators, of which the following is a specification.

This invention relates to cultivators. It is particularly concerned with a power shift mechanism for guiding the cultivator shovels.

It is necessary to guide the shovel gangs of a cultivator or the cultivator itself, in order to follow the irregularities of the rows of the crops that are being cultivated. Various mechanisms have been employed to accomplish this end, all of which usually require considerable exertion on the part of the operator, through either hand or foot power. The force required to operate these cultivators increases when the cultivator is used with a tractor as the motive power, because the cultivation is usually much deeper in such cases, the speed is usually greater, and in many cases, larger cultivators are used, such as those known as two-row cultivators. When a tractor is used, the attention of the operator is largely required to manipulate the tractor, making it desirable to relieve him of the necessity for manual operation of the cultivator. If he is required to exert considerable force on the cultivator operation, he may be thrown out of balance, or, otherwise, prevented from properly manipulating the tractor.

One of the objects of the invention is to provide a cultivator, which may be easily controlled by the operator.

A more particular object is to provide a cultivator which utilizes the power of the tractor for guiding it, proper control mechanism being provided which can be easily manipulated by the operator.

Other objects and advantages of the invention will appear from the specification and drawings.

An embodiment of the invention is shown in the drawings in which—

The general features of construction of the cultivator illustrated, correspond with those shown in Patent No. 1,286,557, to which reference is made for a description and illustration of the operation of the cultivator. It will be understood that the improvement of this application can be applied to other forms of cultivators, the above type being chosen for convenient purposes of illustration and description.

Figure 1:
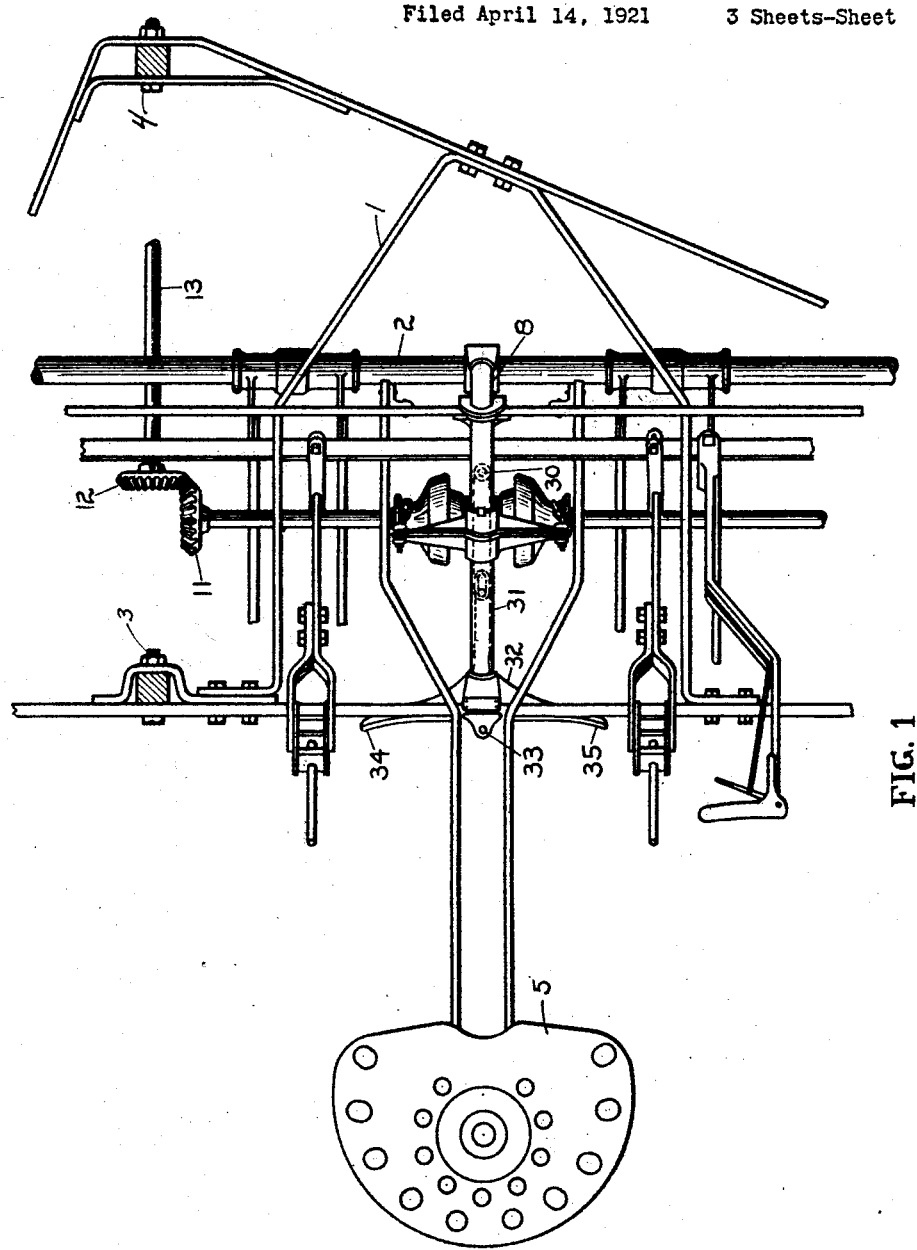
Figure 1 is a partial plan view of the cultivator.

The cultivator includes a frame 1, a portion of which is shown in Figure 1 supported by wheels 2. The frame is suitably constructed for connection to a tractor, having for that purpose, two connecting bolts 3 and 4. A seat 5 is provided for the operator. The cultivator shovels are carried by a drag bar 6 pivoted to a drag bar support 7 carried by the rock shaft 8 shown in Figure 2. The bent end of this shaft is connected to the drag bar support and its other portion is journaled in suitable bearings on the cultivator frame. When the shaft is rotated, its downwardly projecting end swings from side to side carrying with it the drag bar support, and, thereby, guiding the drag bars and cultivator shovels. This provides what is known as a pendulum support for the drag bar.

It is sometimes desirable to pivot the wheels of the cultivator and move them in unison with the drag bar support, or to otherwise support the drag bar and combine it with the pivot wheels. The present invention may be used with such combinations as will be clear from the explanation made hereinafter.

Figure 2:
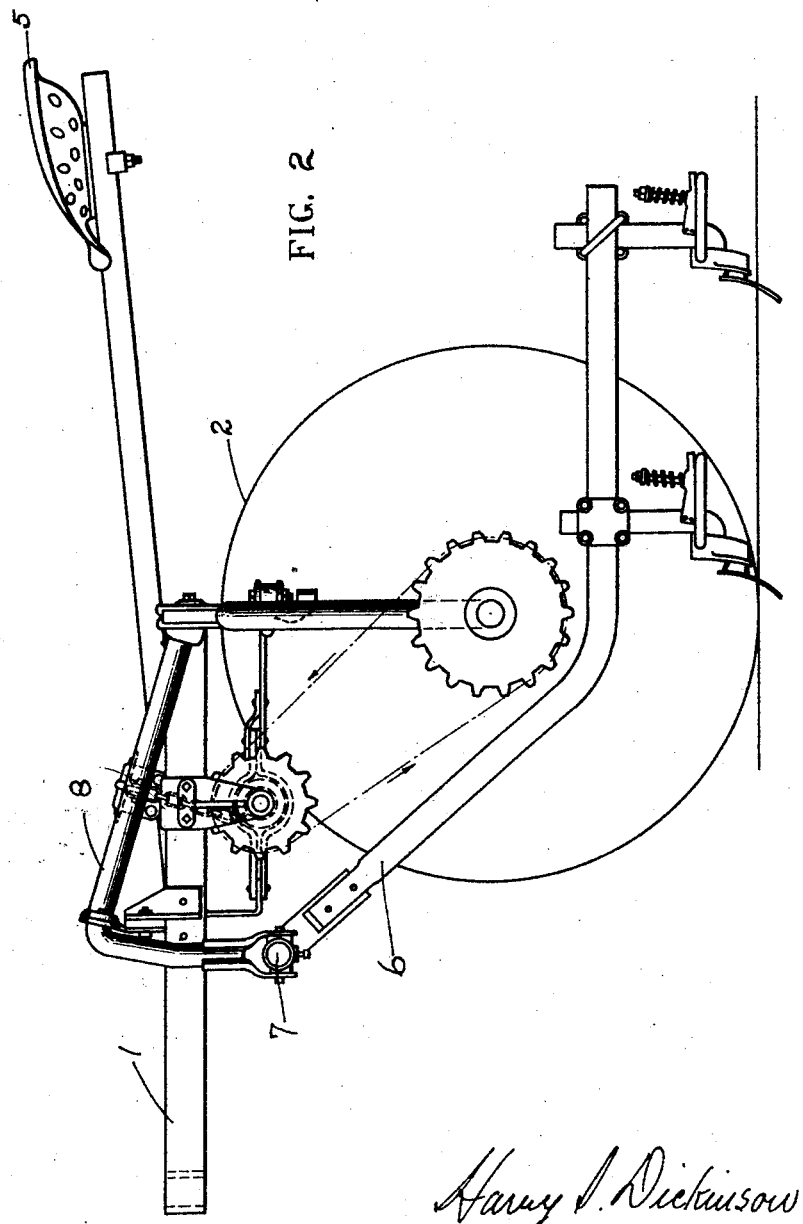
Figure 2 is a side elevation with the rear wheel removed.

The power shift mechanism has been applied so as to oscillate the rock shaft 8 for guiding the cultivator. This mechanism is more particularly as follows:

A shaft 10 is journaled on the cultivator frame for continuous rotation. It may be continuously rotated by a chain and sprocket connection with one of the cultivator wheels as shown in Figure 2, or by means of bevel gears 11 and 12 and a shaft 13 driven by power from the tractor as illustrated in Figure 1. This shaft has a double face clutch member 14 keyed to it in such a way that the clutch member has a limited sliding motion along the shaft. It is normally biased to a central position by means of springs 15 abutting against it and against collars 16 keyed to the shaft. The two faces of the clutch member 17 and 18 cooperate respectively with complementary clutch members 19 and 20 loosely journaled on the shaft 10 and provided with thrust bearings 21 and 22 to absorb the lateral thrust occasioned by throwing the clutch into engagement. Each of the clutch members 19 and 20 has fixed to it a chain, cable or the like, the chain 23 connected to clutch member 19 being connected to one end of an arm 24 keyed to the rock shaft 8 and the other clutch member 20 having a chain 25 connected to the opposite end of said arm. By means of this construction, when the clutch member 14 is shifted in one direction, it will engage one of the clutch members 19 or 20 and rotate that member, winding up its chain and pulling down on one of the arm 24, thereby, rotating the rock shaft 8 and shifting the drag bars and simultaneously unwinding the chain from the other clutch member. The opposite movement takes place when the clutch member 14 is shifted in the opposite direction.

The mechanism for shifting clutch member 14 includes a collar 26 having projections 27 fitted through holes 28 in the bifurcated end of an arm 29 pivoted to the frame at the point 30 and connected by a slot connection to a link 31 rigidly fixed to a bracket 32 pivoted on a vertical pivot 33 to the cultivator frame. The bracket 32 may be oscillated about its vertical pivot by means of foot levers 34 and 35. This rotation is transmitted to the link 31, which shifts the arm 29 about its pivot, thereby, moving the clutch collar to the right or left to shift the clutch member 14 into one of its engaging positions. The foot levers 34 and 35 can be easily changed to be operated by hand or by a side push of the knee of the operator if desired, it being simply necessary to position the levers so that they may be thus manipulated.

Figure 3:
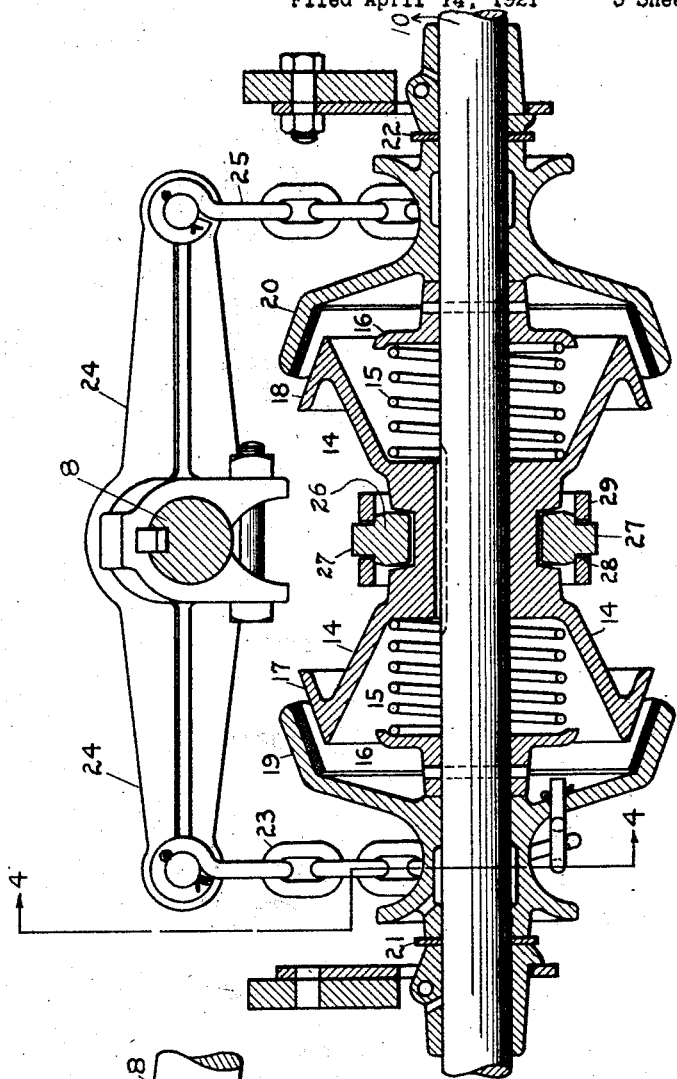
Figure 3 is a sectional view of the principal members of the power shift mechanism.
Figure 4:
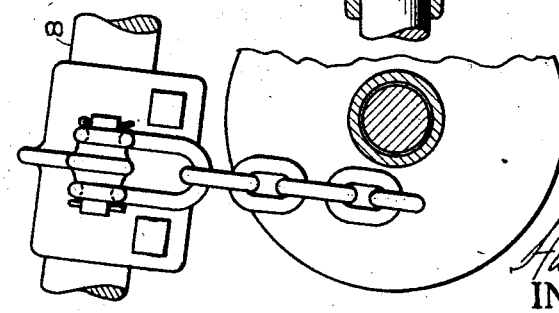
Figure 4 is a section on the line 4—4 of Figure 3.

The mechanism operates as follows:

Assuming that the cultivator is being pulled forward and that the shaft 10 is continuously rotated; if the operator wishes to shift the shovel gangs to the right, he pushes upon the right hand foot lever 35 which turns the link 31 in a counter-clockwise direction as viewed in Figure 1, thereby, moving the clutch collar and clutch member 14 to the left against the pressure of spring 15 and causing it to engage the clutch member 19. Rotation of the shaft is thereupon transmitted to the clutch member 19 and chain 23 is wound upon that clutch member, thereby, pulling down on the left hand end of the lever 24 as viewed in Figure 3 to cause a counter-clockwise rotation of rock shaft 8 which shifts the drag bars to the right. As soon as the operator relieves the pressure on the foot lever, the clutch will be returned to its normal inoperative position by the spring 13 and the weight of the parts will tend to return the drag bars and shovels to normal position. If, for any reason, they are not so returned, or, if the operator wishes to shift them in the opposite direction, he need only apply a slight pressure to the left hand foot lever 34, whereupon, a reverse movement of the parts will take place causing the drag bars to be shifted to the left.

The pressure required on the foot lever is very slight and the power required to shift the cultivator drag bars is small as compared with the power available. The control is responsive to a slight pressure by means of the foot of the operator. He can, consequently, shift the gangs quickly and easily without unbalancing himself or otherwise interfering with the manipulation of the tractor controls or other cultivator controls.

It will be understood that the structure shown is for purposes of illustration and that variations can be made therein without departing from the spirit or the scope of the invention as defined in the appended claims.

What I claim is:

1. A tractor cultivator having a wheeled frame, a transversely movable drag bar support, drag bars connected to said support, a rock shaft connected to the drag bar support, and power operated means for oscillating the rock shaft to shift the drag bar support transversely.

2. A two-row tractor cultivator having a wheeled frame, a transversely movable drag bar support, a rock shaft having an arm connected to the drag bar support, a power operated means for oscillating the rock shaft, and means for controlling the power operated means so that the rock shaft can be oscillated in either direction, but will be free to return to its original position when the power operated means is disconnected.

3. A tractor cultivator having a wheeled frame, a transversely movable drag bar support, a rock shaft having an arm connected to said support, a power shaft on the wheeled frame, a clutch device, connections between the clutch device and the rock shaft, and controlling means for the clutch.

In testimony whereof, I affix my signature.

HARRY S. DICKINSON.